United States Patent [19]

Hayes, Sr. et al.

[11] 4,106,579
[45] Aug. 15, 1978

[54] LOAD ANALYZER FOR AUTOMOTIVE VEHICLE

[76] Inventors: Marvin F. Hayes, Sr.; Marvin F. Hayes, Jr., both of 12424 Dawn La., Cerritos, Calif. 90701

[21] Appl. No.: 781,351

[22] Filed: Mar. 25, 1977

[51] Int. Cl.² .................. G01G 19/08; G01G 3/14
[52] U.S. Cl. .................. 177/137; 177/210 EM
[58] Field of Search .................. 177/210 EM, 137

[56] References Cited

U.S. PATENT DOCUMENTS

| | | | |
|---|---|---|---|
| 3,097,714 | 7/1963 | Vickery | 177/210 |
| 3,360,062 | 12/1967 | Potter | 177/210 EM X |
| 3,493,773 | 2/1970 | Power | 177/210 EM X |
| 3,648,790 | 3/1972 | Bishop | 177/137 |

*Primary Examiner*—George H. Miller, Jr.

*Attorney, Agent, or Firm*—Fulwider, Patton, Rieber, Lee & Utecht

[57] ABSTRACT

A load analyzer is provided for use with an automotive vehicle in which sensors having relatively reciprocal elements are arranged between the load bed and the axles of the vehicle. The load bed is spring biased relative to the axles, so that loading of the vehicle forces the load bed downward, thereby altering the relative position of the elements of the sensors. Each sensor provides a signal indicative of the relative position of its elements. An indicator responds to the signal by indicating the weight present in the load bed, as derived from the magnitude of the sensor signal, which in turn is proportional to the spring constant of the springs supporting the load bed relative to the axles. The indicator is adjustable so that it may be recalibrated by placing a known weight in the vehicle load bed and adjusting the output indication to correspond to that weight.

3 Claims, 4 Drawing Figures

LOAD ANALYZER FOR AUTOMOTIVE VEHICLE

THE FIELD OF THE INVENTION

The present invention relates to load measuring systems for determining the weight of a load on the axles of an automotive vehicle.

BACKGROUND OF THE INVENTION

Heretofore, there has not been a useful means for installation on a vehicle to provide an indication of weight in the load bed or loading compartment or receptacle of a vehicle. Conventional systems for determining the vehicle weight measure the entire weight of a vehicle, or of a loaded axle of a vehicle. These systems involve a spring supported platform located at the roadway level. A vehicle is driven onto the platform so that the entire vehicle or rear axle thereof can be weighed. Such weighing systems are quite large and expensive and are suitable for use only in specialized locations. For example, such weighing systems are employed at highway truck weighing stations under the administration of State Police or other governmental authorities to determine whether or not vehicles are overweight. Since these conventional truck scales are so expensive and require considerable room for operation and manipulation of the vehicles to be weighed, trucking firms and other facilities where trucks are located generally find it unattractive to utilize these conventional devices. Consequently, weight estimates in loading are largely based on guess work, and inaccuracies of weight estimation are quite frequent.

The result of the failure of the art heretofore to provide a convenient compact load measuring system suitable for installation on a vehicle has resulted in the assessment of innumerable fines and penalties for overweight vehicles. Moreover, the highways and roadways are subjected to inordinately rapid deterioration due to the degrading effects of use by vehicles in which overweight conditions are not detected. In addition, such overweight vehicles represent a severe safety hazard in that their braking distance is significantly increased, although the driver of the vehicle may be totally unaware of the overloaded condition of the vehicle.

Furthermore, the present inaccurate weight estimating techniques frequently result in the dispatch of a truck or other commercial vehicle in an underloaded condition. That is, in many instances a vehicle departs from its loading facility only partly loaded, although the dispatcher may well have estimated the vehicle to be loaded to its maximum capacity. The result is a loss of cartage revenues due to vehicles traveling in a short-loaded condition. This inevitably leads to increased freight rates to compensate for inefficient transport conditions of vehicles.

The present invention is a compact and economical vehicle load measuring system that may be readily installed to great advantage in alleviating the foregoing problems. Unlike conventional load measuring systems, the present invention does not require a "drive-in" facility to support the entire bulk of an axle and which must extend at least beyond the width of vehicle wheel separation. Rather, small sensors are employed and are disposed between the vehicle load bed and the vehicle axle. Since the weight of the vehicle chassis does not vary significantly, it is unnecessary to repeatedly measure this portion of the vehicle weight as is done in conventional weighing facilities. Rather, it is only necessary to measure the variable load which is carried in the load bed or compartments of the vehicle. Thus, rather than employing separate scale systems as utilized in conventional truck weighing systems in order to derive the load weight by measuring the deflection of a spring, the present invention utilizes the existing leaf springs or other resilient or elastic load supporting means for the purpose of determining the load in a vehicle load bed. Such leaf springs or other elastic supporting means are supplied as standard equipment on virtually all automotive vehicles, and are interposed between the axles and chassis of the vehicle.

A further application of the invention is in connection with commercial facilities where vehicle loading forms a part of a transaction. For example, at grain elevators, sand and gravel yards, asphalt plants, and other bulk purchasing facilities, materials are frequently purchased on the basis of weight as determined by conventional truck weighing scales. In such facilities, long queue lines frequently form at the truck weighing scales during periods of heavy use. Utilizing the present invention, however, an individual truck need not wait in a line for access to a scale, but instead load on the chassis of the vehicle can be readily and easily determined. The invention also has great utility in association with moving and storage vans. In these vehicles, inaccuracies in load estimating frequently give rise to customer complaints and suspicions of inaccurate weight. By employing the present invention in connection with such moving vans, the customer will be able to ascertain for himself the actual weight loaded prior to the departure of the vehicle.

DETAILED DESCRIPTION OF THE EMBODIMENT

Figure 1:
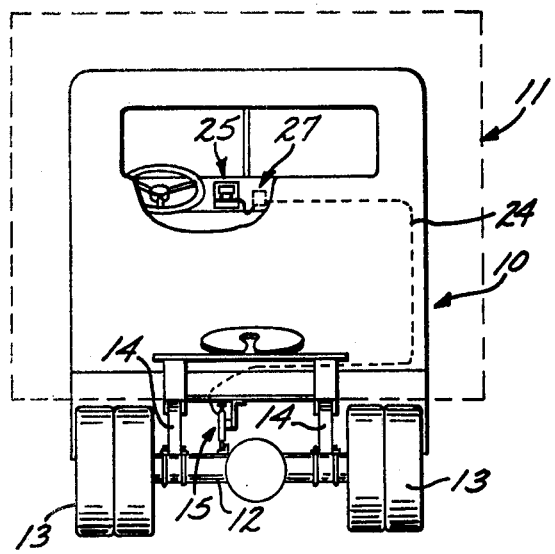
FIG. 1 illustrates an installation of the invention on a truck as viewed from the rear.
Figure 2:
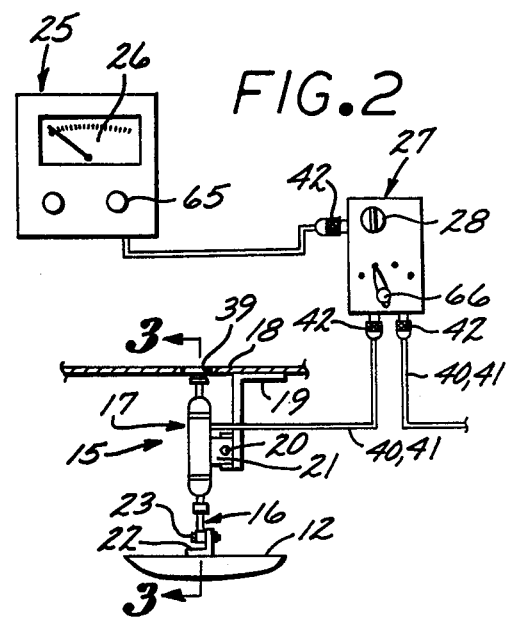
FIG. 2 is an enlarged view of the functional components of the invention.
Figure 3:
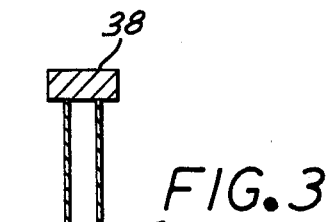
FIG. 3 is an enlarged sectional view taken along the lines 3—3 of FIG. 2.

Referring now to the illustration of FIG. 1, there is depicted a semi-trailer truck cab 10 and a cargo load enclosure indicated by dotted lines 11. The cargo box 11 is carried by vehicle axles 12 in a spring biased arrangement that allows relative movement therebetween. The rearmost vehicle axle 12 is visible and carries the double sets of wheels 13. The load bed 11 is biased above the axles 12 by means of leaf springs 14. A sensor 15, illustrated in some detail in FIGS. 2 and 3, is provided with a pair of sensors elements 16 and 17 which are longitudinally movable relative to each other. The physical configuration of the element 16 is that of a rod which reciprocates within an annular sleeve of jacket formed by the sensor element 17. The sensor element 17 is anchored to the base 18 of the load bed 11 by means of an angle 19 which extends downward from the underside of the base 18 and which is welded or bolted thereto. A bolt 20 extending through a flange 21 of the sensor element 17 secures the sensor element 17 to the downwardly extending leg of the angle 19 and hence to the base 18 of the load bed. The rod shaped sensor element 16 is attached to the axle 12 by means of a bracket 22 welded to the axle 12 and a pivot pin arrangement 23 that rotatably anchors the lower extremity of the sensor 16 to the axle 12.

The sensor 15 generates a signal which is passed by a connecting cable harness 24 indicated in dotted lines in FIG. 1 to an indicator 25, which may be located in the cab of the vehicle near the driver's position as depicted. Indicator 25 is connected to the sensor 15 to receive the signal generated by the sensor and to provide an indication of weight in the load receptacle 11 on the meter face 26. An adjustment mechanism may be provided within the circuit box 27 for altering the indication provided by the indicator 25 to allow recalibration of the sensor 15. This adjustment may be made by means of a recessed slotted screw 28 which is the movable element of a potentiometer 29 located within the circuit box 27.

The physical construction of the sensor elements 16 and 17 are depicted in detail in FIG. 3. It can be seen that the generally cylindrical element 16 rides within a longitudinal bore defined through the elongated annular element 17, so that if the cylindrical element 16 is considered to be fixed, the annular element 17 is forced downward in response to weight increases in the load bed 11 and rises upward when the load bed 11 is unloaded. These variations occur by virtue of the force exerted by the leaf springs 14 on the base 18 of the load bed 11, and by the opposing force of gravity from the weight of the load.

The annular sensor element 17 includes primary electrical coils 30 and 31 wound on cylindrical forms with a hollow core and a secondary induction coil 32 similarly wound and longitudinally displaced from the primary. The primary coils 30 and 31 are connected to the vehicle battery 33 to draw electrical power therefrom through the circuitry depicted in FIG. 4. The secondary coil 32 is connected to the indicator 25 to provide an electrical signal thereto.

The cylindrical sensor element 16 is formed with a pivotal connection relative to the axle 12 at the pivot pin 23 for rotation in a longitudinal plane parallel to the orientation of the vehicle. The structure of the sensor element 16 includes an annular wall 34 of stainless steel tubing within which is located a ferromagnetic core 35 which is interiorly disposed in reciprocal fashion in juxtaposition relative to the primary coils 30 and 31 and the secondary coil 32. Movement of the ferromagnetic core 35 relative to the secondary 32 varies the signal provided to the indicator 25. The core 35 is of circular cross section throughout and has one tapered end 36. Tapering is a desirable feature in that it facilitates eliciting a linear response from the secondary coil 32. This geometric configuration of the ferromagnetic core 35 has proven to be the most desirable when the primary coils 30 and 31 and the secondary coil 32 are of annular configuration and are longitudinally displaced from each other as depicted. Movement of the ferromagnetic core results from movement of the entire sensor member 16 through the smooth annular ferrules or collars 37 which are secured in position to define an annular opening in the sensor element 17.

The upper extremity of the sensor element 16 is equipped with a cap 38 which closes the shaft 34 so that foreign material cannot enter the shaft. A clearance is provided in the base 18 of the load bed 11 as by the aperture 39 to allow the upper end of the sensor element 16 to pass through the base 18 in instances of elastic movement of the chassis relative to the axle. Such movement occurs during travel of the vehicle, especially over rough roads. Naturally, the base 18 must be a false floor, or other provision must be made to accommodate passage of the upper end of the sensor element 16 through the plane of the base 18.

It should be understood that a separate sensor may be associated with each axle of the vehicle and that the indicator 25 may be connected to selectively respond to any one of the sensors 15 to the exclusion of the other sensors. The electrical connecting cables 40 and 41 from each sensor 15 are combined in the connecting cable harness 24 and extend from the associated sensor to a common junction box 27. A dial 66 selects the sensor element 15 which is to be connected to the indicator 25.

A releasable electric jack 42 is provided in association with the junction box 27 between the indicator 25 and the various sensors 15. In this way a single indicator 25 can be used to service several sensors on a single vehicle. Moreover, quick disconnect jacks 42 may be provided in association with the electrical circuit connections 40 and 41 from each of the sensors 15 so that the control box 27 can be employed to serve any number of sensors 15 in any number of different vehicles. In one application of the invention, sensor elements 15 and the junction box 27 associated therewith might be installed permanently on each vehicle. A single indicator 25 could then be brought from vehicle to vehicle and plugged into the junction box 27 installed thereon at the jack 42 at the times when measurement of vehicle cargo weight is desired.

Figure 4:
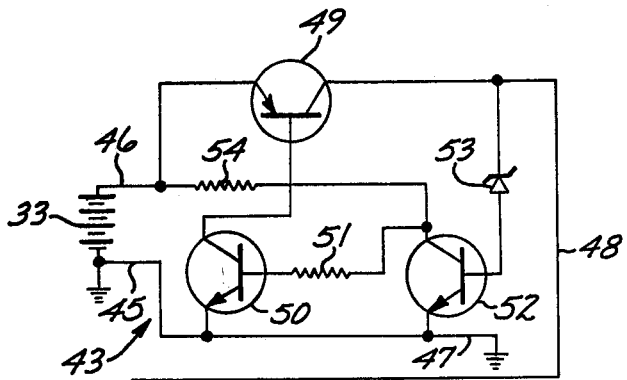
FIG. 4 is a schematic diagram of electrical circuitry employed in the invention.
Figure 4:
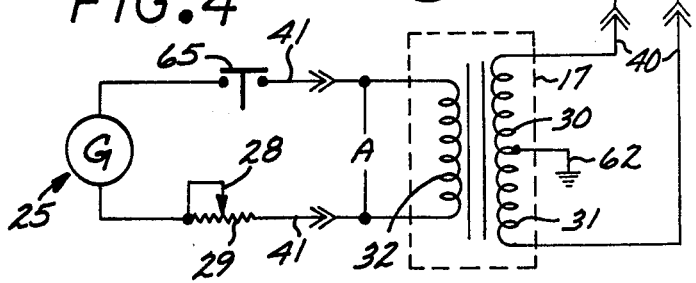

The electrical circuitry of the load analyzer of the invention includes a voltage regulation circuit, indicated at 43 in FIG. 4, which is coupled to the vehicle electrical system, such as to the conventional 12 volt lead storage battery 33 that is provided as standard equipment on most automotive vehicles. In addition, a circuit for transforming direct current to alternating current is provided and is indicated at 44. The transformer circuit is coupled to the voltage regulation circuit 33 and to the primary coils 30 and 31.

The voltage regulation circuit 43 has input leads 45 and 46 connected to the vehicle electrical system. The lead 45 may be any suitable form of ground connection coupled to the vehicle chassis ground. The lead 46 is coupled to a direct current potential relative to ground. In conventional automotive systems which have a negative ground and use a 12 volt lead storage battery, the voltage potential at lead 46 is positive 12 volts.

The voltage regulation circuit 43 also involves an output lead 47 connected to vehicle ground and an output 48 connected to the transformer circuit 44. The voltage regulation circuit 43 includes a first transistor 49 having an emitter connection to the input lead 46 and having a collector connection to the output lead 48. A base connection at the transistor 49 leads to the collector of a second transistor 50, the emitter of which is connected to vehicle ground as indicated and the base of which is connected through a dropping resistor 51 to the collector of a third transistor 52. A zener diode 53 is connected between the base of the transistor 52 and the output lead 48 to pass current to the base of the transistor 52 when the voltage level of the output lead 48 exceeds a predetermined voltage level. The emitter of transistor 52 is connected to vehicle ground and a resistor 54 is connected between the input lead 46 and the collector of the transistor 52.

In the operation of the voltage regulating circuit 43, a positive signal will appear at the base of transistor 50.

Transistor 50 will conduct and a negative signal will appear at the base of transistor 49. This forward biases the transistor 49 to conduct until the voltage on output lead 48 is greater than the rated value of the zener diode 53. Once this upper limit is exceeded, the zener diode 53 will conduct to raise the base of transistor 52 to a positive level. The positive potential at the base of transistor 52 will cause transistor 52 to conduct, thus decreasing the potential appled to the base of transistor 50. This in turn will decrease the current flow through transistor 50 thus lowering the strength of the signal at the base of transistor 49, which in turn will decrease current flow through transistor 49. The circuit will thereby stabilize to hold the voltage level on output lead 48 at a value determined by the rated value of the zener diode 53 and the characteristics of the transistors. A positive stablized DC voltage is thereby provided on output lead 48 and is transmitted to the multivibrator circuitry 44.

The multivibrator circuit 44 includes a pair of transistors 55 and 56. The emitters of both of the transistors 55 and 56 are coupled together and are also connected through a resistor 57 to the direct current signal of lead 48. The bases of transistors 55 and 56 are connected separately through separate R-C circuits to the collectors of each other. That is, the base of transistor 55 is coupled through a parallel combination of capacitor 58 and resistor 59 to the collector of the transistor 56. Similarly, the base of transistor 56 is coupled through the parallel arrangement of the capacitor 60 and the resistor 61 to the collector of transistor 55. The collectors of the transistors 55 and 56 are coupled to opposing ends of the primary circuitry. That is, the collector of transistor 55 is coupled to primary coil 30 while the collector of transistor 56 is coupled to primary coil 31. The primary coils 30 and 31 are joined together at their opposing ends, and the junction is grounded as indicated at 62. Separate blocking diodes 63 and 64 are connected from the bases of the transistors 55 and 56 respectively to the emitters of the same transistors. Separate resistors 65 and 66 are connected from the bases of the transistors 55 and 56 respectively to the lead 48 which is held at a constant positive DC voltage level as previously described.

The voltage potential from lead 48 is appled to the transistor bases of the transistors 55 and 56 through the resistors 65 and 66, which provide bias to the bases of their respective transistors. A positive bias on the base of transistor 56 causes that transistor to conduct, thus raising the potential applied to the base of transistor 55 in accordance with the time constant controlled by the values of capacitor 58 and resistor 59. As the base bias to transistor 55 increases, the point is reached at which transistor 55 begins to conduct. This reduces current flow through transistor 56 but increases current to the R-C network formed by the capacitor 60 and resistor 61. As current increases through the R-C network formed by capacitor 60 and resistor 61, the base bias to transistor 56 is increased, thus drawing additional current through transistor 55. An oscillating signal is thus provided on the output leads 40 of the multivibrator circuit 44, the frequency of which is controlled by the values of the R-C networks employed. A frequency of less than one hundred cycles per second is necessary for the proper operation of the device.

In the utilization of the invention, the sensors 15 are provided between axles 12 and the load receptacle 11 of an automotive vehicle in which the load compartment 11 is elastically mounted relative to the axles 12. The relative reciprocal movement of the sensor elements 16 and 17 produces an output signal indictive of the relative positions of these elements. The element 17, carrying the primary coils 30 and 31 and the secondary coil 32, is anchored to the load compartment 11 while the element 16 carrying the ferromagnetic core 35 is anchored to the axle 12. The position of the ferromagnetic core 35 in relation to the primary and secondary coils is directly proportional to the modulus of elasticity of the springs 14. Ideally, the springs 14 have an elastic constant so that the movement of the ferromagnetic core 35 relative to the primary and secondary coils is governed by the equation $$(s = k \cdot x)$$

where $x$ is the spring deflection, $k$ is the elastic spring constant, and $s$ is the relative movement of the core 35 toward the vehicle loading compartment 11. By shaping the core 35 to a tapered point 36, an approximate linear output from the secondary 32 is achieved to provide an indication of weight in the load compartment 11. By adjusting the turn screw 28 of potentiometer 29, the indication provided on the scale 26 of the indicator 25 may be altered to allow recalibration.

To calibrate the instrument, one merely loads a known weight into the compartment 11 of the vehicle directly above the sensor 15 to be calibrated. The dial 66 is turned to select that sensor, and the turn screw 28 is adjusted until the meter reading on the scale 26 reflects the known weight. The known weight is then removed and the load compartment 11 may be loaded with the cargo to be transported. After loading, but prior to movement of the vehicle, the spring loaded actuating switch in the form of a push button 65 is depressed.

The push button 65 is interposed between the secondary 32 and the meter of indicator 25. Thus actuation of the switch 65 enables the secondary to produce a signal on the indicaor 25. When depressed, the needle of the indicator 25 moves across the scale 26 which is calibrated in units of weight. The needle thus indicates the actual load in the cargo receiving department. The provision of a switch 65 is desirable to hold the circuit dormant in a normal inactive condition. The push button 65 is located in the meter or indicator 25.

The control box 27 containing the voltage regulating circuitry and the multivibrator circuitry may be hand held or may be mounted in the car of a vehicle as indicated in FIG. 1.

The particular embodiment of the invention depicted in the drawings will undoubtedly give rise to various modifications and alterations which will be readily apparent to those familiar with truck weight measurement systems and electrical circuitry. Accordingly, the foregoing description should not be construed as limiting as to the invention, but rather the scope of the invention is defined in the claims appended hereto.

We claim:

1. A load measuring system for use on an automotive vehicle in which a load bed is carried by vehicle axles in spring biased arrangement to allow relative movement therebetween comprising:

a sensor having a pair of elements including primary and secondary induction coils with said primary connected to the vehicle electrical system to draw electrical power therefrom and wherein one of said sensor elements includes a ferromagnetic core mounted in reciprocal fashion relative to said secondary, whereby the position of said ferromagnetic core relative to said secondary varies the magnitude of said signal, and wherein said elements are longitudinally movable relative to each other, one of said elements being secured to said load bed and the other of said elements being secured to a vehicle axle for generating a signal indicative of relative position of said sensor elements;

indicator means connected to said sensor to receive said signal to provide an indication of weight in said load bed and connected to said secondary to receive an electrical signal provided therefrom;

adjustment means for altering the indication provided by said indicator means to allow recalibration of said sensor; and a voltage regulation circuit coupled to said vehicle electrical system and means for transforming direct current to alternating current coupled to said voltage regulation circuit and to said primary.

2. Apparatus according to claim 1 further characterized in that said voltage regulation circuit is comprised of:

input leads connected to the vehicle electrical system with a first input lead coupled to vehicle ground and with a second input lead coupled to a direct current potential relative to ground;

a first output lead connected to vehicle ground and a second output lead connected to said means for transforming alternating current to direct current;

first transistor means having an emitter connection to said second input lead, a collector connection to said second output lead, and a base connection to the collector of a second transistor, the emitter of which is connected to vehicle ground, and the base of which is connected through a dropping resistor to the collector of a third transistor;

a zener diode connected between the base of said third transistor and said second output lead to pass current to the base of said third transistor when the voltage level of said second output lead exceeds a predetermined voltage level, with the emitter of said third transistor connected to vehicle ground; and a resistor connected between said second input lead and the collector of said third transistor.

3. Apparatus according to claim 1 further characterized in that said means for transforming direct current to alternating current is a multivibrator circuit including a pair of transistors having their emitters coupled together and also coupled through a resistor to a direct current potential relative to vehicle ground and having their bases connected separately through separate R-C circuits to the collectors of each other, and the collectors of said transistors are coupled to opposing ends of a primary, the center of which is coupled to vehicle ground, and separate blocking diodes are connected from the bases of each transistor to the emitters thereof, and separate resistors are connected from the bases of each transistor to said direct current potential relative to ground.

* * * * *